(12) United States Patent
Takatani et al.

(10) Patent No.: US 9,644,094 B2
(45) Date of Patent: May 9, 2017

(54) BUTYL RUBBER COMPOSITION AND HOSE USING SAME

(71) Applicant: NICHIRIN CO., LTD., Hyogo (JP)

(72) Inventors: Ken Takatani, Hyogo (JP); Yoshio Nakano, Hyogo (JP)

(73) Assignee: NICHIRIN CO., LTD., Hyogo (JP)

( * ) Notice: Subject to any disclaimer, the term of this patent is extended or adjusted under 35 U.S.C. 154(b) by 260 days.

(21) Appl. No.: 14/429,206

(22) PCT Filed: Sep. 6, 2013

(86) PCT No.: PCT/JP2013/074116
§ 371 (c)(1),
(2) Date: Mar. 18, 2015

(87) PCT Pub. No.: WO2014/045907
PCT Pub. Date: Mar. 27, 2014

(65) Prior Publication Data
US 2015/0247032 A1    Sep. 3, 2015

(30) Foreign Application Priority Data

Sep. 19, 2012   (JP) .................................. 2012-206248

(51) Int. Cl.
*C08L 61/14*   (2006.01)
*B32B 25/10*   (2006.01)
(Continued)

(52) U.S. Cl.
CPC ................ *C08L 61/14* (2013.01); *B32B 1/08* (2013.01); *B32B 25/10* (2013.01); *B32B 25/14* (2013.01);
(Continued)

(58) Field of Classification Search
CPC .......... C08L 61/14; C08L 23/28; C08L 61/06; C08L 61/28; C08L 53/00;
(Continued)

(56) References Cited

U.S. PATENT DOCUMENTS

2008/0087350 A1   4/2008   Takagi et al.
2012/0199237 A1   8/2012   Oyaizu et al.
2013/0168001 A1   7/2013   Abad et al.

FOREIGN PATENT DOCUMENTS

CN           1602335 A     3/2005
CN         102666720 A     9/2012
(Continued)

OTHER PUBLICATIONS

International Search Report issued in PCT/JP2013/074116 mailed on Nov. 19, 2013 (2 pages).

*Primary Examiner* — Michael C Miggins
(74) *Attorney, Agent, or Firm* — Osha Liang LLP

(57) ABSTRACT

A butyl rubber composition is preferably used for an intermediate rubber layer 3 of a composite flexible hose formed by laminating, from the inner side, an innermost layer 2, intermediate rubber layer 3, fiber reinforcement layer 4, and an external rubber layer 5 in this order. The butyl rubber composition includes halogenated butyl rubber, styrene-isobutylene block copolymer, white filler, white reinforcing agent, brominated alkylphenol-formaldehyde resin, phenol resin, and methylol melamine, and 5 to 45 parts by weight of the styrene-isobutylene block copolymer is added to 100 parts by weight of the halogenated butyl rubber.

8 Claims, 3 Drawing Sheets

(51) Int. Cl.
- *B32B 1/08* (2006.01)
- *C08L 23/28* (2006.01)
- *F16L 11/08* (2006.01)
- *B32B 25/14* (2006.01)
- *B32B 25/18* (2006.01)
- *F16L 11/04* (2006.01)
- *C08L 53/00* (2006.01)
- *C08L 61/06* (2006.01)
- *C08L 61/28* (2006.01)

(52) U.S. Cl.
CPC .............. *B32B 25/18* (2013.01); *C08L 23/28* (2013.01); *C08L 23/283* (2013.01); *C08L 53/00* (2013.01); *F16L 11/04* (2013.01); *F16L 11/085* (2013.01); *B32B 2270/00* (2013.01); *B32B 2597/00* (2013.01); *C08L 61/06* (2013.01); *C08L 61/28* (2013.01); *C08L 2205/035* (2013.01); *Y10T 428/1372* (2015.01)

(58) Field of Classification Search
CPC ............. C08L 2205/035; C08L 23/283; Y10T 428/1372; B32B 25/10; B32B 1/08; B32B 25/14; B32B 25/18; B32B 2270/00; B32B 2597/00; F16L 11/085; F16L 11/04
See application file for complete search history.

(56) References Cited

FOREIGN PATENT DOCUMENTS

| | | |
|---|---|---|
| EP | 1074777 A1 | 2/2001 |
| EP | 2075116 A1 | 7/2009 |
| JP | 2000-220770 A | 8/2000 |
| JP | 2001-200961 A | 7/2001 |
| JP | 2003-336774 A | 11/2003 |
| JP | 4732720 B2 | 7/2011 |
| WO | 02/32992 A2 | 4/2002 |
| WO | 02/48257 A2 | 6/2002 |

BUTYL RUBBER COMPOSITION AND HOSE USING SAME

TECHNICAL FIELD

The present invention relates to a butyl rubber composition and a hose using the same, and particularly relates to a composite flexible hose suitable for purposes such as transportation of refrigerants, and a butyl rubber composition suitable for the composite flexible hose.

BACKGROUND

Composite flexible hoses used for transporting refrigerant gases for vehicle air conditioners and refrigerant gases for freezer or refrigerator vehicles are required not only to have gas barrier properties and flexibility for restraining the permeation of refrigerant gas but also to resist an external pressure and an internal pressure of the transported gas. An example of such composite flexible hoses is recited in Patent Literature 1.

As shown in FIG. 3, a composite flexible hose 101 of Patent Literature 1 is formed by laminating, from the inner side, an innermost layer 102, an intermediate rubber layer 103, a fiber reinforcement layer 104, and an external rubber layer 105 in this order. Because the innermost layer 102 is made of polyamide resin, gas barrier properties are obtained. Furthermore, because the intermediate rubber layer 103 is made of halogenated butyl rubber, not only flexibility but also gas barrier properties and water barrier properties are obtained.

In so-called eco cars such as hybrid vehicles and electric vehicles, an electric compressor is mounted as an air conditioner system. It is necessary in the electric compressor to electrically insulating an internal motor from a housing, and polyol ester (POE) which excels in electric insulation is used as lubricating oil for the electric compressor. To maintain this electric insulation, it is necessary to restrain the entrance (permeation) of water into the air conditioner system as much as possible. For this reason, a hose used for transporting refrigerants for such an air conditioner system is also required to restrain the permeation of water from the outside as much as possible, i.e., required to have better water barrier properties.

In the case of the composite flexible hose of Patent Literature 1, however, into the intermediate rubber layer 103 (made of butyl rubber) for obtaining water barrier properties, an adhesive component is kneaded for direct vulcanization adhesion with the polyamide resin in the innermost layer 102. Because this adhesive component is highly hydrophilic, the water outside the hose easily enters the rubber layer and is easily released inside the hose. As such, the permeation of the water from the outside of the hose is not sufficiently restrained. For this reason, the hose of Patent Literature 1 is not suitable for electric compressors as it is, and the water barrier properties must be further improved.

In the meanwhile, an example of hoses for transporting refrigerants, which have improved gas barrier properties of butyl rubber, is a hose recited in Patent Literature 2. In this hose, the gas barrier properties, flexibility, and processability are improved by adding polybutene and white filler to the butyl rubber of the innermost layer. However, the tensile strength is insufficient. Furthermore, because of the absence of a resin layer, the gas barrier properties of this hose are inferior to the gas barrier properties of hoses such as the hose of Patent Literature 1 having a polyamide resin layer. Moreover, because the butyl rubber significantly swells with POE lubricating oil, the hose of Patent Literature 2 in which the innermost layer is made of butyl rubber cannot be used for electric compressors as it is. The water barrier properties of the butyl rubber are not mentioned in the document.

CITATION LIST

Patent Literatures

[Patent Literature 1] Japanese Patent No. 3891718
[Patent Literature 2] Japanese Patent No. 4732720

SUMMARY OF INVENTION

Technical Problem

With the rubber composition of Patent Literature 2, the gas barrier properties are slightly improved. However, when the arrangement shown in FIG. 3 is employed to obtain excellent gas barrier properties, it is impossible to perform direct vulcanization adhesion of the polyamide resin in the innermost layer 102 with the butyl rubber in the intermediate rubber layer 103. For this reason, an adhering step using an adhesive is required to join the polyamide resin in the innermost layer 102 with the butyl rubber in the intermediate rubber layer 103. This disadvantageously increases the cost and causes irregularities in the adhesion force.

When Patent Literature 1 is combined with Patent Literature 2, i.e., when the adhesive component of Patent Literature 1 is kneaded in while the hardness of the rubber composition of Patent Literature 2 is maintained, the water barrier properties are insufficient and the tensile strength is deteriorated. Furthermore, when the amount of the white filler is increased and/or the amount of the plasticizer is decreased to improve the water barrier properties, the rubber becomes hard and the flexibility is deteriorated. Moreover, the viscosity before the vulcanization increases, and rubber burning (rough surface) occurs on account of the increase in the head pressure at the time of rubber extrusion molding.

The present invention has been done to solve the problems above, and an object of the present invention is to provide a butyl rubber composition which is directly vulcanization-adhered to resin without using an adhesive and has improved water barrier properties while the extrusion molding characteristics, flexibility, and tensile strength being maintained, and to provide a hose using the butyl rubber composition.

Solution to Problem

To achieve the object above, as a result of diligent study predominantly on polymers to be added and softeners, the inventors of the subject application have found that, when styrene-isobutylene block copolymer is added to halogenated butyl rubber, the flexibility and the extrusion molding characteristics are maintained without deteriorating the water barrier properties, and the tensile strength is improved. The present invention was completed in this way.

To put it differently, in the present invention, halogenated butyl rubber, styrene-isobutylene block copolymer, white filler, white reinforcing agent, brominated alkylphenol-formaldehyde resin, phenol resin, and methylol melamine are included, and 5 to 45 parts by weight of the styrene-isobutylene block copolymer are added to 100 parts by weight of the halogenated butyl rubber. Furthermore, preferably, the white filler is at least one selected from a group consisting of talc, mica, sericite, montmorillonite, and clay, and the white reinforcing agent is silicic acid. Furthermore, preferably, polybutene is further included, and 5 to 15 parts by weight of the polybutene are added to 100 parts by weight of the halogenated butyl rubber.

With the butyl rubber composition of the present invention, the water barrier properties are improved and sufficient adhesion to resin is achieved without using an adhesive. Furthermore, the extrusion molding characteristics, the flexibility, and the tensile strength are maintained without increasing the hardness.

A hose of the present invention includes a rubber layer including the above-described butyl rubber composition. Furthermore, the hose of the present invention is preferably arranged such that, from the inner side, an innermost layer, an intermediate rubber layer, a fiber reinforcement layer, and an external rubber layer are laminated in this order, and the intermediate rubber layer includes the butyl rubber composition of the present invention.

With the hose of the present invention, the resin layer is strongly adhered to the rubber layer without the intervention of an adhesive layer, and the water barrier properties are improved while maintaining the extrusion molding characteristics, the flexibility and the tensile strength. This hose is therefore suitable for purposes such as transportation of refrigerant.

Advantageous Effects of Invention

With the butyl rubber composition of the present invention, the water barrier properties are good, and sufficient adhesion to resin is achieved without using an adhesive. Furthermore, the extrusion molding characteristics, the flexibility, and the tensile strength are maintained without increasing the hardness.

With the hose including the butyl rubber composition of the present invention, the resin layer is strongly adhered to the rubber layer without the intervention of an adhesive layer, and the water barrier properties are improved while maintaining the extrusion molding characteristics, the flexibility and the tensile strength. This hose is therefore suitable for purposes such as transportation of refrigerant.

DESCRIPTION OF EMBODIMENTS

The following will describe an embodiment of the present invention with reference to figures.

To begin with, Embodiment 1 will be described with reference to FIG. 1.

Embodiment 1

Figure 1:
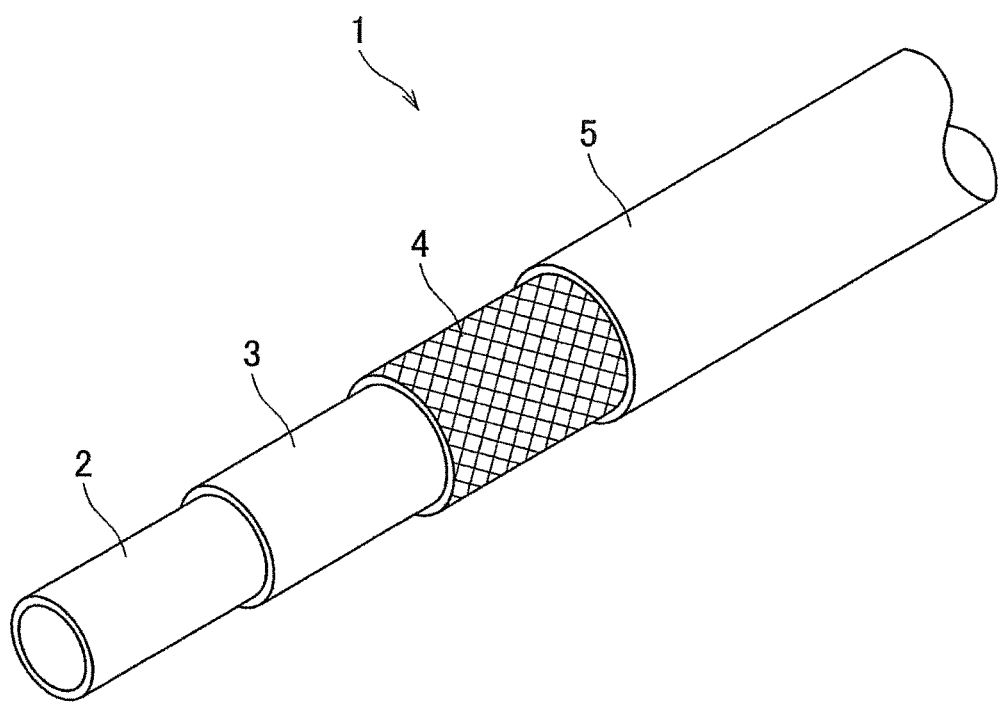
FIG. 1 is a perspective view of a composite flexible hose of Embodiment 1 of the present invention.

FIG. 1 is a perspective view of a composite flexible hose of the embodiment of the present invention. In this composite flexible hose 1, no adhesive layer is provided between an innermost layer 2 and an intermediate rubber layer 3, and a fiber reinforcement layer 4 and an external rubber layer 5 are provided in this order on the intermediate rubber layer 3.

The intermediate rubber layer 3 is made of a butyl rubber composition of the embodiment of the present invention.

This butyl rubber composition is formed in such a way that, halogenated butyl rubber is used as raw rubber, and styrene-isobutylene block copolymer, white filler, a white reinforcing agent, brominated alkylphenol-formaldehyde resin, phenol resin, and methylol melamine are added to the raw rubber.

The halogenated butyl rubber is, for example, one, two, or more types of rubbers such as chlorinated butyl rubber and brominated butyl rubber. The halogenated butyl rubber is preferably solely constituted by brominated butyl rubber, particularly in consideration of reactivity. Into the halogenated butyl rubber, butyl rubber may be blended.

The styrene-isobutylene block copolymer is not particularly limited as long as polystyrene (PS) is used as a hard segment whereas polyisobutylene (PIB) is used as a soft segment. Examples of the styrene-isobutylene block copolymer include styrene-isobutylene diblock copolymer (SIB) and styrene-isobutylene-styrene triblock copolymer (SIBS). Among these substances, SIBS is preferred on account of its excellent tensile strength. An example of SIBS is SIBSTAR made by KANEKA CORPORATION.

The white reinforcing agent is silicic acid. Examples of the silicic acid include anhydrous silicic acid and hydrous silicic acid. The hydrous silicic acid including many silanol groups is preferred because it is well adhered to the polyamide resin. Adding the white reinforcing agent improves the adhesiveness between the intermediate rubber layer 3 and the innermost layer 2 (resin layer).

The white filler is at least one type selected from a group consisting of talc, mica, sericite, montmorillonite, and clay. Adding the white filler improves the water barrier properties.

Examples of the brominated alkylphenol-formaldehyde resin include TACKIROL 250-1 and TACKIROL 250-3 both made by TAOKA CHEMICAL COMPANY, LIMITED. TACKIROL 250-3 is particularly preferred because no catalyst is required. The brominated alkylphenol-formaldehyde resin functions not only as the adhesive component but also a vulcanizing agent for halogenated butyl rubber which is raw rubber.

Examples of the phenol resin which is added to the rubber composition of the intermediate rubber layer 3 in order to improve the adhesion property include 2,6-dimethylol-p-cresol, resol type phenol resin, and novolak type phenol resin. In consideration of the improvement in the adhesion property and good reactivity with methylol melamine, SUMIKANOL 620 (modified resol-type phenol-formaldehyde resin made by Sumitomo Chemical Company, Limited) is preferred.

Examples of the methylol melamine which is the other component to improve the adhesion property include SUMIKANOL 508 and SUMIKANOL 507AP both made by Sumitomo Chemical Company, Limited. In consideration of good reactivity with phenol resin, SUMIKANOL 507AP is preferred.

In the present invention, 5 to 45 parts by weight of the styrene-isobutylene block copolymer are preferably added for 100 parts by weight of the halogenated butyl rubber. The added amount of the styrene-isobutylene block copolymer is more preferably 15 to 45 parts by weight, and further preferably 15 to 35 parts by weight. When the added amount of the styrene-isobutylene block copolymer is less than 5 parts by weight, the hardness increases and the flexibility is not obtained, and the tensile strength is lowered. When the added amount is more than 45 parts by weight, compressive permanent set is deteriorated.

The added amount of the white filler is preferably 50 to 200 parts by weight for 100 parts by weight of the halogenated butyl rubber, and more preferably 70 to 180 parts by weight.

The added amount of the white reinforcing agent is preferably 10 to 50 parts by weight for 100 parts by weight of the halogenated butyl rubber, more preferably 15 to 30 parts by weight, and further preferably 20 to 30 parts by weight. The adhesion property is bad when the added amount of the white reinforcing agent is less than 10 parts by weight, whereas the viscosity is high and the rough surface may occur at the time of extrusion molding, when the added amount is more than 50 parts by weight.

The added amount of the brominated alkylphenol-formaldehyde resin is preferably 5 to 15 parts by weight for 100 parts by weight of the halogenated butyl rubber, more preferably 6 to 13 parts by weight, and further preferably 7 to 10 parts by weight. When the added amount is less than 5 parts by weight, the speed of vulcanization reaction with the raw rubber becomes slow in the vulcanization and the physical properties are deteriorated. On the other hand, when the added amount is more than 15 parts by weight, adhesion to the roll during the kneading and extrusion molding and the rough surface occur, and the workability is deteriorated.

The added amount of the phenol resin which is a component for improving the adhesion property is preferably 0.5 to 10 parts by weight for 100 parts by weight of the halogenated butyl rubber, more preferably 1 to 5 parts by weight, and further preferably 2 to 5 parts by weight. When the added amount is less than 0.5 part by weight, the improvement in the adhesion property is insufficient. On the other hand, when the added amount is more than 10 parts by weight, the physical properties (such as flexibility and compressive permanent set) of the rubber composition are deteriorated.

The added amount of the methylol melamine is preferably 0.5 to 10 parts by weight for 100 parts by weight of the halogenated butyl rubber, and more preferably 1 to 5 parts by weight. When the added amount is less than 0.5 part by weight, the improvement in the adhesion property is insufficient. On the other hand, when the added amount is more than 10 parts by weight, the physical properties (such as flexibility and compressive permanent set) of the rubber composition are deteriorated.

To this rubber composition, a suitable amount of carbon black, zinc oxide, stearic acid, plasticizer, age resister, processing aid, or the like may be added.

Back to FIG. 1, the innermost layer 2 of the composite flexible hose 1 is made of modified polyamide formed by blending polyamide with carboxyl group-containing modified polyolefin. Examples of the polyamide include polyamide 6, polyamide 11, polyamide 12, polyamide 4-6, polyamide 6-6, polyamide 6-10, polyamide 6-12, polyamide MXD-6, and copolymer of at least two of them.

A preferred example of the carboxyl group-containing modified polyolefin is modified polyolefin to which 0.1 to 10 mole percent of functional groups is added in such a way that acid anhydride such as maleic anhydride is graft-polymerized with polyolefin with which olefin such as ethylene, propylene, and butadiene and/or diene monomer is homopolymerized or copolymerized.

The blend ratio between the polyamide and the modified polyolefin is 90/10 to 50/50, preferably 65/35 to 55/45. When the rate of the modified polyolefin increases, the flexibility of the hose tends to be improved but the gas barrier properties tend to be deteriorated. When the rate of the modified polyolefin decreases, the gas barrier properties tend to be improved but the adhesiveness with the intermediate rubber layer 3 and the flexibility tend to be deteriorated.

Examples of the modified polyamide include Zytel ST series made by E. I. du Pont de Nemours and Company such as Zytel ST801 Zytel ST811, and Zytel ST811HS each of which seems to be alloy of polyamide 6 and maleic-anhydride-modified polyolefin.

The innermost layer 2 is formed by extrusion-molding the above-described modified polyamide to be pipe-shaped. The thickness of the pipe is preferably 0.05 mm or more in consideration of the extrusion molding characteristics and the gas barrier properties, and is preferably 0.5 mm or less in consideration of the flexibility.

The intermediate rubber layer 3 is formed by extrusion molding to be typically 1.0 to 3.0 mm thick, preferably 1.5 to 2.5=thick. With the butyl rubber composition of this embodiment, the surface of the extruded intermediate rubber layer 3 does not become rough, and hence the workability after this process and the quality of the end product are improved.

After the extrusion molding of the intermediate rubber layer 3, the fiber reinforcement layer 4 and then the external rubber layer 5 are laminated by braiding, spiral winding, or the like. As the fiber reinforcement layer 4 and the external rubber layer 5, known materials may be used. Examples of the material of the fiber reinforcement layer 4 include natural fiber and synthetic fiber such as polyvinyl alcohol fiber, polyamide fiber, polyester fiber, and aramid fiber used independently or after treated by RFL (Resorcinol Formaldehyde Latex adhesive). Examples of the external rubber layer 5 include synthetic rubber which excels in ozone resistance such as EPDM, CR, CSM, IIR, and XIIR. The external rubber layer 5 is typically about 1.0 to 2.0 mm thick.

The composite flexible hose 1 of the present embodiment is obtained in such a way that, after the intermediate rubber layer 3, the fiber reinforcement layer 4, and the external rubber layer 5 are laminated on the innermost layer 2, the layers are entirely vulcanized. The vulcanization is preferably carried out in a steam pressure at about 150 to 180 degrees centigrade.

The composite flexible hose 1 is, for example, manufactured in the following manner. The modified polyamide for the innermost layer is extruded at a rate of 12 m/minute to be 0.15 mm thick on a mandrel which is made of resin and is 11.75 mm in external diameter, so that the innermost layer 2 is formed. After about 30 seconds, the rubber composition for the intermediate layer is extruded at a rate of 12 m/minute to be 1.9 mm thick on the innermost layer 2. Then polyethylene terephthalate yarns having been RFL-treated are braided so that the fiber reinforcement layer 4 is formed, and lastly EPDM is extruded to be 1.1 mm thick so that the external rubber layer 5 is formed. This not-vulcanized hose is vulcanized by being heated for 40 minutes at 160 degrees centigrade, with the result that the composite flexible hose 1 is obtained. On account of the vulcanization, the rubber composition for the intermediate layer is vulcanization-adhered to the innermost layer 2.

The obtained composite flexible hose 1 has sufficient gas barrier properties, water barrier properties, flexibility, and tensile strength, and in which the resin layer is strongly adhered to the rubber layer. In particular, the strong adhesion between the resin layer and the rubber layer is maintained even if the hose 1 is significantly bended or after aging.

In this composite flexible hose 1, the intermediate rubber layer 3 is formed directly on the innermost layer 2 and is vulcanization-adhered to the innermost layer 2. It is therefore unnecessary to take time for evaporation of a solvent as a step for forming an adhesive layer is omitted, and hence the entire number of steps is reduced. The intermediate rubber layer 3 is formed in such a way that the rubber composition for the intermediate rubber layer 3 is extruded and molded directly on the outer surface of the innermost layer 2.

Examples

Now, examples and comparative examples of Embodiment 1 will be described. The present invention, however, is not limited to these examples.

As shown in Table 1 below, rubber compositions of Examples 1 to 5 and Comparative Examples 1 and 2 which are different from one another in the rate of styrene-isobutylene block copolymer with respect to brominated butyl rubber (Br-IIR) were vulcanization-cured, and tests for the items shown in Table 1 were performed.

TABLE 1

| | | | EXAMPLE 1 | EXAMPLE 2 | EXAMPLE 3 | EXAMPLE 4 |
|---|---|---|---|---|---|---|
| RAW MATERIALS | | Br-IIR | 100 | 100 | 100 | 100 |
| | | CARBON BLACK | 57 | 57 | 57 | 57 |
| | | HYDROUS SILICIC ACID | 23 | 23 | 23 | 23 |
| | | TALC | 77 | 77 | 77 | 77 |
| | | STEARIC ACID | 1 | 1 | 1 | 1 |
| | | STYRENE-ISOBUTYLENE BLOCK COPOLYMER | 5 | 15 | 25 | 35 |
| | | ZINC OXIDE | 5 | 5 | 5 | 5 |
| | | BROMINATED ALKYLPHENOL-HOLMALDEHYDE RESIN | 8 | 8 | 8 | 8 |
| | | PHENOL RESIN | 3 | 3 | 3 | 3 |
| | | METHYLOL MELAMINE | 2 | 2 | 2 | 2 |
| ORDINARY STATE PHYSICAL PROPERTIES | | HARDNESS (JIS-A) | 84 | 82 | 80 | 78 |
| | | JUDGMENTS EXCELLENT: 79 OR LOWER, GOOD: 80 TO 82, ACCEPTABLE: 83 TO 85, BAD: 86 OR HIGHER | ACCEPTABLE | GOOD | GOOD | EXCELLENT |
| | | TENSILE STRENGTH (MPa) | 10.6 | 10.8 | 11.0 | 11.2 |
| | | JUDGMENTS EXCELLENT: 10.1 OR HIGHER GOOD: 9.6 TO 10, ACCEPTABLE: 9.1 TO 9.5, BAD: 9 OR LOWER | EXCELLENT | EXCELLENT | EXCELLENT | EXCELLENT |
| | | ELONGATION (%) | 310 | 330 | 350 | 370 |
| COMPRESSIVE PERMANENT SET | | COMPRESSIVE PERMANENT SET (%) | 43 | 45 | 47 | 50 |
| | | JUDGMENTS EXCELLENT: 40 OR LOWER, GOOD: 40 TO 49, ACCEPTABLE: 50 TO 59, BAD: 60 OR HIGHER | GOOD | GOOD | GOOD | ACCEPTABLE |
| WATER BARRIER PROPERTIES | | WATER VAPOR PERMEABILITY (g/m$^2$/24 h) | 1.1 | 1.1 | 1.1 | 1.1 |
| | | JUDGMENTS EXCELLENT: 1.3 OR LOWER, GOOD: 1.4 TO 1.5, ACCEPTABLE: 1.6 T0 1.7, BAD: 1.8 OR HIGHER | EXCELLENT | EXCELLENT | EXCELLENT | EXCELLENT |
| ADHESION PROPERTY | | INSIDE RESIN (PA6) | RUBBER COHESIVE FAILURE | RUBBER COHESIVE FAILURE | RUBBER COHESIVE FAILURE | RUBBER COHESIVE FAILURE |
| | | JUDGMENTS | GOOD | GOOD | GOOD | GOOD |
| EXTRUSION MOLDING CHARACTERISTICS | | JUDGMENTS EXCELLENT: NO ROUGH SURFACE GOOD: NO HARMFUL ROUGH SURFACE INSUFFICIENT: HARMFUL ROUGH SURFACE BAD: EXTRUSION IS IMPOSSIBLE | GOOD | GOOD | GOOD | EXCELLENT |

| | | | EXAMPLE 5 | COMPARATIVE EXAMPLE 1 | COMPARATIVE EXAMPLE 2 |
|---|---|---|---|---|---|
| RAW MATERIALS | | Br-IIR | 100 | 100 | 100 |
| | | CARBON BLACK | 57 | 57 | 57 |
| | | HYDROUS SILICIC ACID | 23 | 23 | 23 |
| | | TALC | 77 | 77 | 77 |
| | | STEARIC ACID | 1 | 1 | 1 |
| | | STYRENE-ISOBUTYLENE BLOCK COPOLYMER | 45 | — | 55 |
| | | ZINC OXIDE | 5 | 5 | 5 |
| | | BROMINATED ALKYLPHENOL-HOLMALDEHYDE RESIN | 8 | 8 | 8 |
| | | PHENOL RESIN | 3 | 3 | 3 |
| | | METHYLOL MELAMINE | 2 | 2 | 2 |
| ORDINARY STATE PHYSICAL PROPERTIES | | HARDNESS (JIS-A) | 76 | 87 | 74 |
| | | JUDGMENTS EXCELLENT: 79 OR LOWER, GOOD: 80 TO 82, ACCEPTABLE: 83 TO 85, BAD: 86 OR HIGHER | EXCELLENT | BAD | EXCELLENT |
| | | TENSILE STRENGTH (MPa) | 11.4 | 9.5 | 11.6 |
| | | JUDGMENTS EXCELLENT: 10.1 OR HIGHER GOOD: 9.6 TO 10, ACCEPTABLE: 9.1 TO 9.5, BAD: 9 OR LOWER | EXCELLENT | ACCEPTABLE | EXCELLENT |
| | | ELONGATION (%) | 390 | 280 | 410 |
| COMPRESSIVE PERMANENT SET | | COMPRESSIVE PERMANENT SET (%) | 56 | 42 | 64 |
| | | JUDGMENTS EXCELLENT: 40 OR LOWER, GOOD: 40 TO 49, ACCEPTABLE: 50 TO 59, BAD: 60 OR HIGHER | ACCEPTABLE | GOOD | BAD |

TABLE 1-continued

| | | | | |
|---|---|---|---|---|
| WATER BARRIER PROPERTIES | WATER VAPOR PERMEABILITY (g/m²/24 h) | 1.1 | 1.1 | 1.1 |
| | JUDGMENTS EXCELLENT: 1.3 OR LOWER, GOOD: 1.4 TO 1.5, ACCEPTABLE: 1.6 TO 1.7, BAD: 1.8 OR HIGHER | EXCELLENT | EXCELLENT | EXCELLENT |
| ADHESION PROPERTY | INSIDE RESIN (PA6) | RUBBER COHESIVE FAILURE | RUBBER COHESIVE FAILURE | RUBBER COHESIVE FAILURE |
| | JUDGMENTS | GOOD | GOOD | GOOD |
| EXTRUSION MOLDING CHARACTERISTICS | JUDGMENTS EXCELLENT: NO ROUGH SURFACE GOOD: NO HARMFUL ROUGH SURFACE INSUFFICIENT: HARMFUL ROUGH SURFACE BAD: EXTRUSION IS IMPOSSIBLE | EXCELLENT | BAD | EXCELLENT |

As shown in Table 1, for 100 parts by weight of the brominated butyl rubber, 57 parts by weight of carbon black, 23 parts by weight of hydrous silicic acid which was the white reinforcing agent, 77 parts by weight of talc which was the white filler, 1 part by weight of stearic acid, 5 parts by weight of zinc oxide, 8 parts by weight of brominated alkylphenol-formaldehyde resin, 3 parts by weight of phenol resin, and 2 parts by weight of methylol melamine were commonly added. Based on this common combination, 5 parts by weight, 15 parts by weight, 25 parts by weight, 35 parts by weight, and 45 parts by weight of the styrene-isobutylene block copolymer were added, respectively, in Examples 1 to 5. No styrene-isobutylene block copolymer was added in Comparative Example 1, and 55 parts by weight of the styrene-isobutylene block copolymer was added in Comparative Example 2.

The brominated butyl rubber was BROMOBUTYL2255 (made by JSR Corporation), the carbon black was SHO-BLACK N326 (made by Showa Cabot K.K.) and SHO-BLACK IP200 (made by Showa Cabot K.K.), the hydrous silicic acid was Hi-Sil 233 (made by PPG Industries, Inc.), the talc was MICRO ACE K-1 (Registered Trademark, made by Nippon Talc Co., Ltd.), the styrene-isobutylene block copolymer was SIBSTAR 102T (made by KANEKA CORPORATION), the brominated alkylphenol-formaldehyde resin was TACKIROL 250-1 (made by TAOKA CHEMICAL COMPANY), the phenol resin was SUMIKANOL 620 (made by Sumitomo Chemical Company), and the methylol melamine was SUMIKANOL 507AP (made by Sumitomo Chemical Company).

As shown in Table 1, for each of these rubber compositions of Examples 1 to 5 and Comparative Examples 1 and 2, tests for measuring ordinary state physical properties, compressive permanent set, water barrier properties, adhesion property, and extrusion molding characteristics were conducted.

The test for measuring each item was done as below.
(Ordinary State Physical Properties)

A rubber sheet which was about 2 mm thick was formed by press-vulcanization of each of the rubber compositions of Examples 1 to 5 and Comparative Examples 1 and 2, and tests for hardness, tensile strength, and elongation were conducted using a test piece spliced out from each obtained rubber sheet.

The hardness (JIS-A) was measured by a type-A durometer in conformity to JIS K 6253-6, whereas the tensile strength (MPa) and elongation (%) were measured in conformity to JIS K 6251. The hardness was evaluated as "Excellent" when it was 79 or lower, "Good" when 80 to 82, "Acceptable" when 83 to 85, and "Bad" when 86 or higher.

The tensile strength was evaluated as "Excellent" when it was 10.1 or higher, "Good" when 9.6 to 10, "Acceptable" when 9.1 to 9.5, and "Bad" when 9 or lower.
(Compressive Permanent Set)

A test piece was prepared by press-vulcanization in conformity to JIS K 6262 of each of the rubber compositions of Examples 1 to 5 and Comparative Examples 1 and 2, and the compressive permanent set (%) of the test piece was measured at a testing temperature of 100 degrees centigrade, with a testing time of 70 hours, and at a compression rate of 25%.

The compressive permanent set was evaluated as "Excellent" when it was 40 or lower, "Good" when 40 to 49, "Acceptable" when 50 to 59, and "Bad" when 60 or higher.
(Water-Penetration Resistance (Water Barrier Properties))
Water Vapor Permeability (g/m²/24 h)

A rubber sheet which was about 1 mm thick was prepared by press-vulcanization from each of the rubber compositions of Examples 1 to 5 and Comparative Examples 1 and 2. After an opening of a cup in which a drying agent with a known weight was enclosed was sealed by the rubber sheet with reference to JIS Z 0208, the water barrier properties were measured as below, at a testing temperature of 60 degrees centigrade, a testing moisture of 95% RH, and a testing time of 168 hours. A change in the weight of the drying agent with respect to the permeation area of the rubber sheet was calculated as the water vapor permeability per 24 hours. The water vapor permeability was evaluated as "Excellent" when it was 1.3 or lower, "Good" when 1.4 to 1.5, "Acceptable" when 1.6 to 1.7, and "Bad" when 1.8 or higher.
(Adhesion Property)

Figure 2:
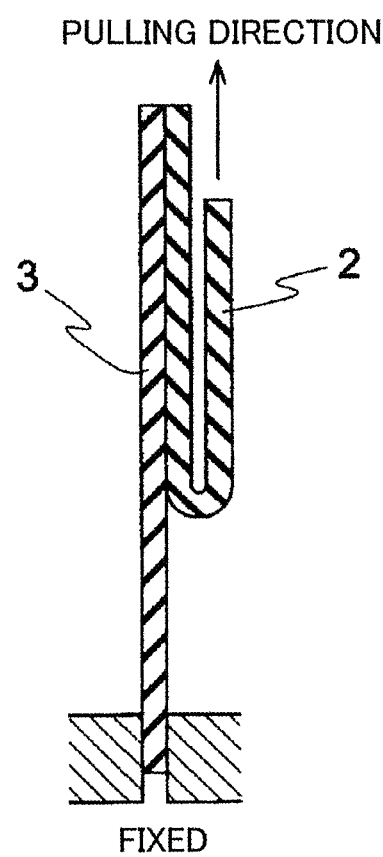
FIG. 2 is a schematic cross section showing an adhesion property test of an intermediate rubber layer.
Figure 3:
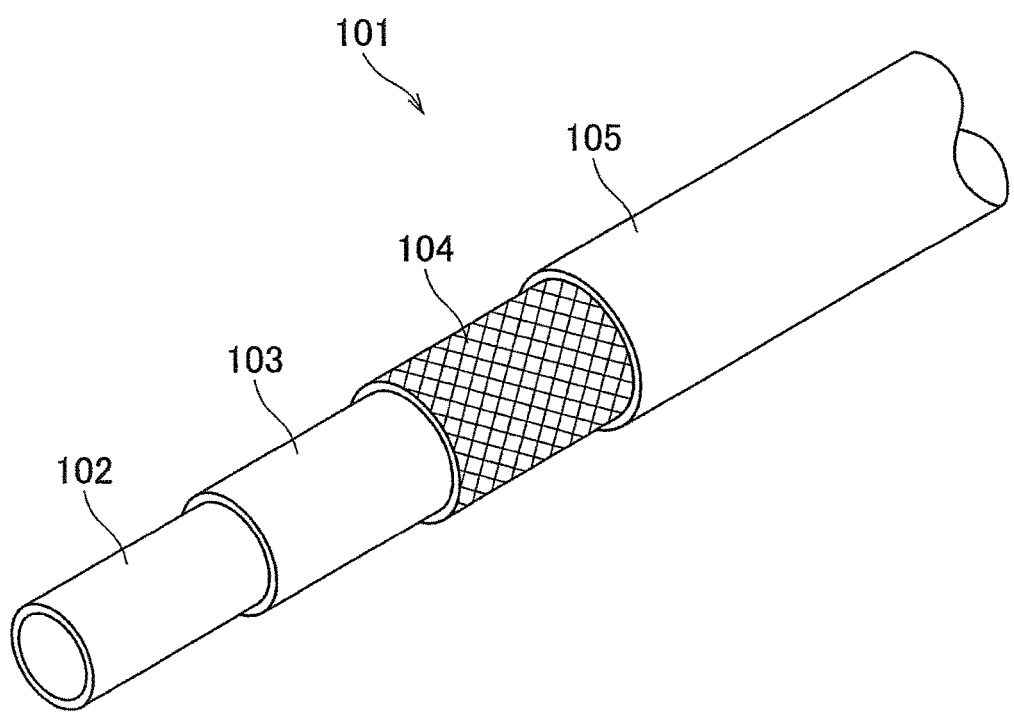
FIG. 3 is a perspective view of a known composite flexible hose.

A layered sheet was prepared by conducting press-vulcanization of innermost layer resin (PA6) which was about 0.15 mm thick and of each of pieces of non-vulcanized butyl rubber about 2 mm thick of Examples 1 to 5 and Comparative Examples 1 and 2. A test piece which was sized about 10 mm wide and 100 mm long was spliced out from the obtained layered sheet, a rubber layer 3 of the test piece was fixed to a tensile testing machine as shown in FIG. 2, the resin layer 2 was pulled at a rate of 50 mm per minute, and the state of peeling off at the adhesive interface was visually observed. The evaluation was "Good" when rubber cohesive failure occurred.
(Extrusion Molding Characteristics)

A rubber tube about 1.9 mm thick was extrusion-molded from each of the rubber compositions of Examples 1 to 5 and Comparative Examples 1 and 2 by an extruder, and the state of the surface skin was visually observed. The extrusion molding characteristics were evaluated as "Excellent" which no irregularities (rough surface) occurred on the surface of the tube, "Good" when no harmful rough surface occurred, "Insufficient" when harmful rough surface occurred, and "Bad" when extrusion was not possible because of severe rough surface.

As the test results shown in Table 1 indicate, in each of Examples 1 to 5 and Comparative Examples 1 and 2, because an adhesion property improving component such as brominated alkylphenol-formaldehyde resin, phenol resin, and methylol melamine is added, the adhesion to the innermost layer resin is sufficiently strong without using an adhesive, and the water barrier properties are excellent because of the inclusion of the white filler such as talc.

However, in Comparative Example 1 in which no styrene-isobutylene block copolymer was added, the hardness is high and hence the flexibility and the extrusion molding characteristics are insufficient, and the tensile strength is low. Furthermore, in Comparative Example 2 in which 55 parts by weight of styrene-isobutylene block copolymer was added, the compressive permanent set is low.

In the meanwhile, in Examples 1 to 5 in which 5 parts by weight, 15 parts by weight, 25 parts by weight, 35 parts by weight, and 45 parts by weight of the styrene-isobutylene block copolymer were added, as described above, the adhesion to the innermost layer resin is sufficiently strong without using an adhesive and the water barrier properties are excellent. Furthermore, the flexibility is obtained without disadvantageous increase in the hardness, no decrease in the tensile strength occurs, and no decrease in the compressive permanent set and the extrusion molding characteristics occurs.

As such, in the rubber composition to which a predetermined amount of styrene-isobutylene block copolymer is added, it is considered that the permeation of water is hindered by the Steric effects of methyl groups in the molecular structure of the isobutylene block [—C(CH$_3$)$_2$CH$_2$—] of the styrene-isobutylene block copolymer, and the water barrier properties are maintained in addition to the tensile strength due to the bonding (crystallization) of the aromatic rings in the styrene block [—CH(C$_6$H$_5$)CH$_2$—] due to the intermolecular forces. Furthermore, because the styrene-isobutylene block copolymer is soft polymer, it is considered that the hardness of the rubber is lowered and the flexibility is obtained.

Now, Embodiment 2 of the present invention will be described.

Embodiment 2

A rubber composition of another embodiment of the present invention is arranged such that polybutene is further added to the rubber composition of Embodiment 1 above. Because the polybutene is significantly cheaper (about ⅓ in cost) than the styrene-isobutylene block copolymer, adding the polybutene reduces the cost of the rubber composition. Furthermore, because the polybutene is softener with the molecular structure of the isobutylene block, the extrusion molding characteristics are improved as the viscosity before the vulcanization is lowered while the permeation of water is restrained. An object of Embodiment 2 is therefore to balance the cost and the characteristics such as the water barrier properties and the extrusion molding characteristics, as compared to Embodiment 1.

That is to say, the rubber composition of this embodiment is arranged such that, to halogenated butyl rubber, styrene-isobutylene block copolymer, polybutene, white filler, white reinforcing agent, brominated alkylphenol-formaldehyde resin, phenol resin, and methylol melamine are added, the white filler is at least one type selected from a group consisting of talc, mica, sericite, montmorillonite, and clay, and the white reinforcing agent is silicic acid.

Preferably, 5 to 15 parts by weight of the polybutene are added to 100 parts by weight halogenated butyl rubber. Preferably, the polybutene is mainly made of isobutylene and is sticky liquid polymer in which a small amount of n-butene is polymerized. The number-average molecular weight of this polybutene preferably falls within the range of 300 to 3700, and the kinematic viscosity (at 100 degrees centigrade) of the polybutene preferably falls within the range of 2 to 5700 mm$^2$/s. When the amount of the polybutene is small, i.e., less than 5 parts by weight, the above-described effect of the polybutene is unlikely to be obtained. On the other hand, when the amount exceeds 15 parts by weight, the tensile strength is lowered and the water barrier properties are deteriorated. This is apparently because the bonding (crystallization) of the aromatic rings on account of the intermolecular forces does not occur because no styrene block is included in the molecular structure.

As described above, as with Embodiment 1, the resin layer is strongly adhered to the rubber layer and sufficient water barrier properties, flexibility, and tensile strength are obtained in Embodiment 2. Furthermore, because the polybutene is added in Embodiment 2, the cost and the above-described characteristics are balanced, because the flexibility, the extrusion molding characteristics or the like are excellent while the cost is reduced.

Examples

Now, examples and comparative examples of Embodiment 2 will be described. It is noted that the present invention is not limited to these examples.

As shown in Table 2 below, each of the rubber compositions of Example 6 to 8 and Comparative Example 3 to 5 which are different from one another in the rate of the polybutene with respect to the brominated butyl rubber (Br-IIR) was vulcanization-cured, and tests for the respective items in Table 2 were conducted in the same manner as in the examples and comparative examples of Embodiment 1 above.

TABLE 2

|  |  | EXAMPLE 6 | EXAMPLE 7 | EXAMPLE 8 |
|---|---|---|---|---|
| RAW MATERIALS | Br-IIR | 100 | 100 | 100 |
|  | CARBON BLACK | 57 | 57 | 57 |
|  | HYDROUS SILICIC ACID | 23 | 23 | 23 |
|  | TALC | 77 | 77 | 77 |
|  | STEARIC ACID | 1 | 1 | 1 |
|  | STYRENE-ISOBUTYLENE BLOCK COPOLYMER | 25 | 25 | 25 |
|  | POLYBUTENE | 5 | 10 | 15 |
|  | ZINC OXIDE | 5 | 5 | 5 |
|  | BROMINATED ALKYLPHENOL- | 8 | 8 | 8 |

TABLE 2-continued

|  |  |  |  |  |
|---|---|---|---|---|
|  | HOLMALDEHYDE RESIN |  |  |  |
|  | PHENOL RESIN | 3 | 3 | 3 |
|  | METHYLOL MELAMINE | 2 | 2 | 2 |
| ORDINARY STATE PHYSICAL PROPERTIES | HARDNESS (JIS-A) | 78 | 76 | 74 |
|  | JUDGMENTS | EXCELLENT | EXCELLENT | EXCELLENT |
|  | EXCELLENT: 79 OR LOWER, GOOD: 80 TO 82, ACCEPTABLE: 83 TO 85, BAD: 86 OR HIGHER |  |  |  |
|  | TENSILE STRENGTH (MPa) | 10.8 | 10.5 | 10.0 |
|  | JUDGMENTS | EXCELLENT | EXCELLENT | GOOD |
|  | EXCELLENT: 10.1 OR HIGHER, GOOD: 9.6 TO 10, ACCEPTABLE: 9.1 TO 9.5, BAD: 9 OR LOWER |  |  |  |
|  | ELONGATION (%) | 360 | 380 | 400 |
| COMPRESSIVE PERMANENT SET | COMPRESSIVE PERMANENT SET (%) | 47 | 46 | 45 |
|  | JUDGMENTS | GOOD | GOOD | GOOD |
|  | EXCELLENT: 40 OR LOWER, GOOD: 40 TO 49, ACCEPTABLE: 50 TO 59, BAD: 60 OR HIGHER |  |  |  |
| WATER BARRIER PROPERTIES | WATER VAPOR PERMEABILITY (g/m$^2$/24 h) | 1.2 | 1.3 | 1.5 |
|  | JUDGMENTS | EXCELLENT | EXCELLENT | GOOD |
|  | EXCELLENT: 1.3 OR LOWER, GOOD: 1.4 TO 1.5, ACCEPTABLE: 1.6 TO 1.7, BAD: 1.8 OR HIGHER |  |  |  |
| ADHESION PROPERTY | INSIDE RESIN (PA6) | RUBBER COHESIVE FAILURE | RUBBER COHESIVE FAILURE | RUBBER COHESIVE FAILURE |
|  | JUDGMENTS | GOOD | GOOD | GOOD |
| EXTRUSION MOLDING CHARACTERISTICS | JUDGMENTS | EXCELLENT | EXCELLENT | EXCELLENT |
|  | EXCELLENT: NO ROUGH SURFACE GOOD: NO HARMFUL ROUGH SURFACE INSUFFICIENT: HARMFUL ROUGH SURFACE BAD: EXTRUSION IS IMPOSSIBLE |  |  |  |

|  |  | COMPARATIVE EXAMPLE 3 | COMPARATIVE EXAMPLE 4 | COMPARATIVE EXAMPLE 5 |
|---|---|---|---|---|
| RAW MATERIALS | Br-IIR | 100 | 100 | 100 |
|  | CARBON BLACK | 57 | 57 | 57 |
|  | HYDROUS SILICIC ACID | 23 | 23 | 23 |
|  | TALC | 77 | 107 | 97 |
|  | STEARIC ACID | 1 | 1 | 1 |
|  | STYRENE-ISOBUTYLENE BLOCK COPOLYMER | — | — | — |
|  | POLYBUTENE | 15 | 15 | 5 |
|  | ZINC OXIDE | 5 | 5 | 5 |
|  | BROMINATED ALKYLPHENOL-HOLMALDEHYDE RESIN | 8 | 8 | 8 |
|  | PHENOL RESIN | 3 | 3 | 3 |
|  | METHYLOL MELAMINE | 2 | 2 | 2 |
| ORDINARY STATE PHYSICAL PROPERTIES | HARDNESS (JIS-A) | 78 | 84 | 85 |
|  | JUDGMENTS | EXCELLENT | ACCEPTABLE | ACCEPTABLE |
|  | EXCELLENT: 79 OR LOWER, GOOD: 80 TO 82, ACCEPTABLE: 83 TO 85, BAD: 86 OR HIGHER |  |  |  |
|  | TENSILE STRENGTH (MPa) | 8.7 | 8.1 | 8.8 |
|  | JUDGMENTS | BAD | BAD | BAD |
|  | EXCELLENT: 10.1 OR HIGHER, GOOD: 9.6 TO 10, ACCEPTABLE: 9.1 TO 9.5, BAD: 9 OR LOWER |  |  |  |
|  | ELONGATION (%) | 310 | 280 | 270 |
| COMPRESSIVE PERMANENT SET | COMPRESSIVE PERMANENT SET (%) | 42 | 50 | 47 |
|  | JUDGMENTS | GOOD | ACCEPTABLE | GOOD |
|  | EXCELLENT: 40 OR LOWER, GOOD: 40 TO 49, ACCEPTABLE: 50 TO 59, BAD: 60 OR HIGHER |  |  |  |
| WATER BARRIER PROPERTIES | WATER VAPOR PERMEABILITY (g/m$^2$/24 h) | 1.6 | 1.3 | 1.3 |
|  | JUDGMENTS | ACCEPTABLE | EXCELLENT | EXCELLENT |
|  | EXCELLENT: 1.3 OR LOWER, GOOD: 1.4 TO 1.5, ACCEPTABLE: 1.6 TO 1.7, BAD: 1.8 OR HIGHER |  |  |  |
| ADHESION PROPERTY | INSIDE RESIN (PA6) | RUBBER COHESIVE FAILURE | RUBBER COHESIVE FAILURE | RUBBER COHESIVE FAILURE |
|  | JUDGMENTS | GOOD | GOOD | GOOD |
| EXTRUSION MOLDING CHARACTERISTICS | JUDGMENTS | EXCELLENT | INSUFFICIENT | INSUFFICIENT |
|  | EXCELLENT: NO ROUGH SURFACE GOOD: NO HARMFUL ROUGH SURFACE INSUFFICIENT: HARMFUL ROUGH SURFACE BAD: EXTRUSION IS IMPOSSIBLE |  |  |  |

As shown in Table 2, for 100 parts by weight of the brominated butyl rubber, 57 parts by weight of carbon black, 23 parts by weight of hydrous silicic acid which was a white reinforcing agent, 77 parts by weight of talc which was a white filler, 1 part by weight of stearic acid, 25 parts by weight of styrene-isobutylene block copolymer, 5 parts by weight of zinc oxide, 8 parts by weight of brominated alkylphenol-formaldehyde resin, 3 parts by weight of phenol resin, and 2 parts by weight methylol melamine were commonly added in Example 6 to 8. The additions in Comparative Example 3 were identical with those of Example 6 to 8 except that no styrene-isobutylene block copolymer was added.

Based on the common combination above, rubber compositions in which 5 parts by weight, 10 parts by weight, and 15 parts by weight of polybutene were added were Example 6 to 8, and a rubber composition in which 15 parts by weight of polybutene were added was Comparative Example 3.

Furthermore, a rubber composition in which the amount of talc was increased to 107 parts by weight as compared to Comparative Example 3 was Comparative Example 4, and a rubber composition in which the amount of talc was increased to 97 parts by weight and the amount of polybutene was decreased to 5 parts by weight was Comparative Example 5.

The brominated butyl rubber, the carbon black, the hydrous silicic acid, the talc, the styrene-isobutylene block copolymer, the brominated alkylphenol-formaldehyde resin, the phenol resin, and the methylol melamine were identical with the materials shown in Table 1 of Embodiment 1 above. The polybutene was polybutene 300H made by Idemitsu Kosan Co., Ltd.

As the test results shown in Table 2 indicate, as with Embodiment 1 above, the adhesion to the innermost layer resin is sufficiently strong without using an adhesive and the extrusion processability is excellent in Example 6 to 8. Furthermore, the hardness does not become excessively high and the flexibility is obtained, and the decrease in the tensile strength and the decrease in the water barrier properties are restrained, and the compressive permanent set is not deteriorated. As such, while the cost is lower than Embodiment 1, adverse effects on the characteristics such as the tensile strength and the water barrier properties are hardly observed. In this way, the cost and the characteristics are excellently balanced (i.e., excellent cost performance is achieved).

In the meanwhile, in Comparative Example 3 in which the styrene-isobutylene block copolymer was not added, the tensile strength is deteriorated. Furthermore, in Comparative Example 4 in which the amount of the white filler was increased as compared to Comparative Example 3 and Comparative Example 5 in which the amount of the white filler was increased whereas the amount of the plasticizer (polybutene) was decreased as compared to Comparative Example 3, the hardness and the extrusion molding characteristics were additionally deteriorated. These comparative examples 3 to 5 were prepared by combining Patent Literature 1 with Patent Literature 2 above. While in Comparative Example 4 the hardness, the adhesion property, and the extrusion molding characteristics were maintained, the water barrier properties and the tensile strength were deteriorated. In Comparative Example 4 and Comparative Example 5, while the adhesion property and the water barrier properties were maintained, the hardness and the extrusion molding characteristics were additionally deteriorated.

INDUSTRIAL APPLICABILITY

The butyl rubber composition of the present invention is directly vulcanization-adhered to resin without using an adhesive and has improved water barrier properties while the extrusion molding characteristics, flexibility, and tensile strength being maintained.

REFERENCE SIGNS LIST 1, 101 COMPOSITE FLEXIBLE HOSE
2, 102 INNERMOST LAYER
3, 103 INTERMEDIATE RUBBER LAYER
4, 104 FIBER REINFORCEMENT LAYER
5, 105 EXTERNAL RUBBER LAYER

The invention claimed is:

1. A butyl rubber composition comprising halogenated butyl rubber, styrene-isobutylene block copolymer, white filler, white reinforcing agent, brominated alkylphenol-formaldehyde resin, phenol resin, and methylol melamine, 5 to 45 parts by weight of the styrene-isobutylene block copolymer being added to 100 parts by weight of the halogenated butyl rubber.

2. A hose comprising a rubber layer including the butyl rubber composition of claim 1.

3. The butyl rubber composition according to claim 1, wherein, the white filler is at least one selected from a group consisting of talc, mica, sericite, montmorillonite, and clay, and the white reinforcing agent is silicic acid.

4. The butyl rubber composition according to claim 3, further comprising polybutene, 5 to 15 parts by weight of the polybutene being added to 100 parts by weight of the halogenated butyl rubber.

5. A hose comprising a rubber layer including the butyl rubber composition of claim 4.

6. A hose comprising a rubber layer including the butyl rubber composition of claim 3.

7. The butyl rubber composition according to claim 1, further comprising polybutene, 5 to 15 parts by weight of the polybutene being added to 100 parts by weight of the halogenated butyl rubber.

8. A hose comprising a rubber layer including the butyl rubber composition of claim 7.

* * * * *